United States Patent [19]
Shimazaki, Seiji

[11] Patent Number: 4,914,929
[45] Date of Patent: Apr. 10, 1990

[54] COOLING UNIT INCLUDING AN EVAPORATOR AND A VIBRATION ABSORPTION MECHANISM THEREFOR

[75] Inventor: Shimazaki, Seiji, Isesaki, Japan
[73] Assignee: Sanden Corporation, Japan
[21] Appl. No.: 324,706
[22] Filed: Mar. 17, 1989
[30] Foreign Application Priority Data Mar. 17, 1988 [JP] Japan .............................. 63-34439[U]

[51] Int. Cl.⁴ ............................................ F25B 39/02
[52] U.S. Cl. ....................................... 62/515; 62/296; 165/69; 181/202; 181/403
[58] Field of Search ........................ 62/51.5, 515, 296; 165/69; 181/202, 291, 403

[56] References Cited
U.S. PATENT DOCUMENTS

| | | | |
|---|---|---|---|
| 3,123,170 | 3/1964 | Bryant | 165/69 |
| 3,316,733 | 5/1967 | Harley, Jr. | 181/403 |
| 4,036,288 | 7/1977 | Neveux | 165/69 |
| 4,295,521 | 10/1981 | Sommars | 165/69 |
| 4,690,209 | 9/1987 | Martin | 165/150 |

FOREIGN PATENT DOCUMENTS 3334992 4/1985 Fed. Rep. of Germany .
59-124428 7/1984 Japan .

Primary Examiner—Ronald C. Capossela
Attorney, Agent, or Firm—Banner, Birch, McKie & Beckett

[57] ABSTRACT

A cooling unit suitable for use in an automobile air conditioning system. The cooling unit includes an evaporator disposed in a casing having air inlet and air outlet openings to permit air passage through the evaporator. A vibration absorbing mechanism comprising an elastic material surrounds a peripheral surface of the evaporator and is disposed between the evaporator and the casing to prevent the transfer of vibration from the evaporator to the casing. Accordingly, the vibration absorption mechanism reduces or eliminates noise related to evaporator vibration from reaching the automotive passenger compartment.

20 Claims, 5 Drawing Sheets

4,914,929

COOLING UNIT INCLUDING AN EVAPORATOR AND A VIBRATION ABSORPTION MECHANISM THEREFOR

BACKGROUND OF THE INVENTION

1. Field of the Invention

This invention relates to a cooling unit including an evaporator therein, and more particularly, to a cooling unit suitable for use in an automotive air conditioning system.

2. Description of the Prior Art

Referring to FIG. 1, a refrigerating circuit of an automotive air conditioning system in accordance with one embodiment of the prior art is shown. Refrigerating circuit 10 includes compressor 11, condenser 12, receiver-dryer 13, expansion valve 14, evaporator 15 and silencer 16, all of which are interconnected through conduit 17. In refrigerating circuit 10, refrigerant gas is compressed by compressor 11. Compressed refrigerant gas flows to condenser 12 and is condensed therein by heat exchange. Condensed refrigerant flows to expansion valve 14 via receiver-dryer 13 and is expanded thereby. Expanded refrigerant then flows to evaporator 15 and is vaporized therein by heat exchange. Vaporized refrigerant returns to compressor 11 via silencer 16. Silencer 16 levels the pulsation of refrigerant flow due to refrigerant being sucked into compressor 11 through valved ports (not shown). The pulsation of the refrigerant flow causes casing 21 of evaporator 15 to vibrate, thereby producing an offensive noise in the automotive passenger compartment.

With reference to FIGS. 2 and 3, a cooling unit in accordance with one embodiment of the prior art is shown. Cooling unit 20 includes evaporator 15 housed in casing 21 having air inlet and air outlet openings 211 and 212. Heat insulating member 22, made of foamed polystyrene, lines an inner surface of casing 21. Evaporator 15 is air-tightly disposed within casing 21 through heat insulating member 22. During operation, an evaporator motor fan (not shown) forces air through evaporator 15 via air inlet and outlet openings 211, 212 as indicated by arrows 23, 24. The refrigerant in evaporator 15 absorbs heat from the air passing therethrough as the heat of evaporation.

In the prior art, the offensive noise produced in the automotive passenger compartment due to the pulsation of refrigerant flow is reduced or eliminated by disposing silencer 16 between evaporator 15 and compressor 11. However, the addition of silencer 16 into the automotive air conditioning system increases component part, inventory and assembly costs.

SUMMARY OF THE INVENTION

In view of the above and other deficiencies of the known prior art, it is a primary object of the present invention to reduce or eliminate the offensive noise produced in an automotive passenger compartment due to evaporator vibration caused by the pulsation of refrigerant flow, without incorporating a silencer between the evaporator and compressor.

It is another object of the present invention to provide a cooling unit including an evaporator and a vibration absorption mechanism to absorb evaporator vibration and prevent such vibration from being transferred to the cooling unit casing.

It is a further object of the present invention to provide the evaporator with a vibration absorbing mechanism having desirable insulating characteristics.

Thus, the invention involves a cooling unit for an automotive air conditioning system comprising a casing and an evaporator disposed within the casing. The casing includes air inlet and air outlet openings to permit air passage through the evaporator. A vibration absorbing mechanism is provided for absorbing vibration produced by the evaporator. The vibration absorbing mechanism comprises an elastic member surrounding a peripheral surface of the evaporator.

Other important features and advantages of the invention will be apparent from the following description and accompanying drawings wherein for purposes of illustration only, a specific form of the invention is shown in detail.

DETAILED DESCRIPTION OF THE PREFERRED EMBODIMENTS

Figure 1:
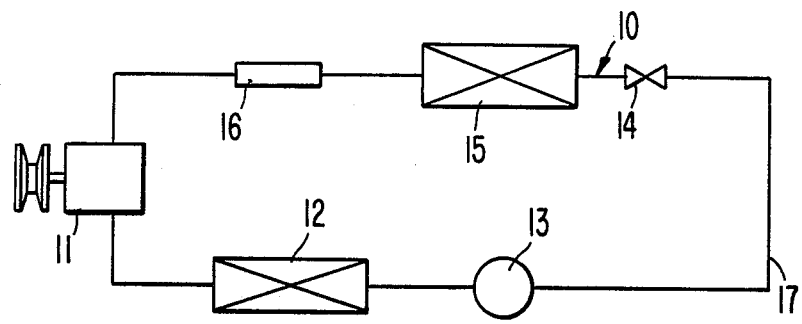
FIG. 1 is a block diagram of a refrigerating circuit of an automotive air conditioning system in accordance with the prior art.
Figure 3:
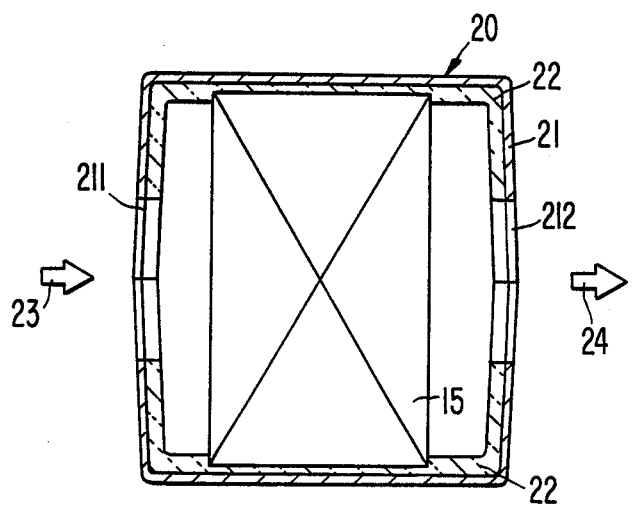
FIG. 3 is a cross-sectional side view of the cooling unit shown in FIG. 2.
Figure 2:
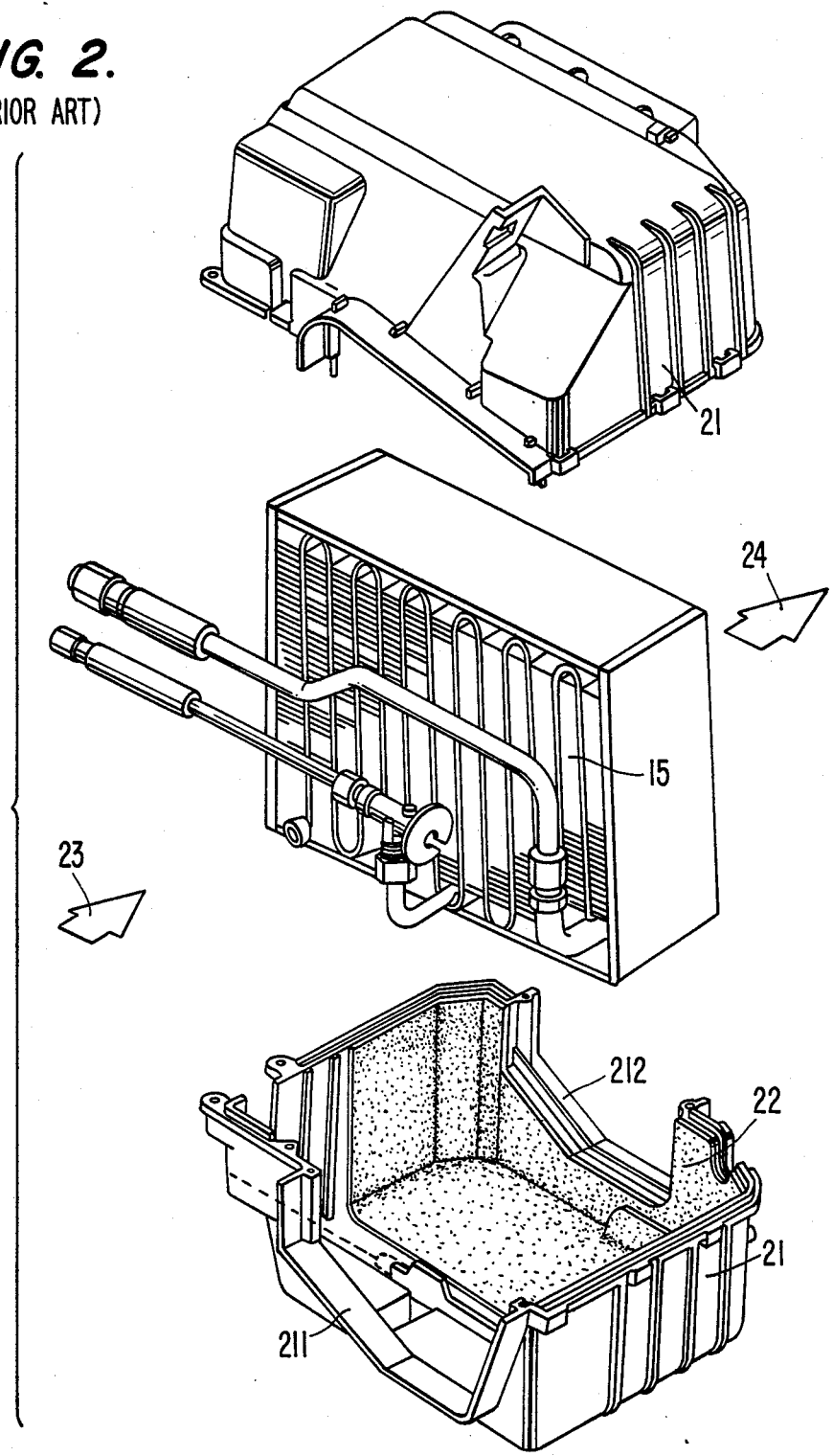
FIG. 2 is an exploded perspective view of a cooling unit in accordance with the prior art.
Figure 4:
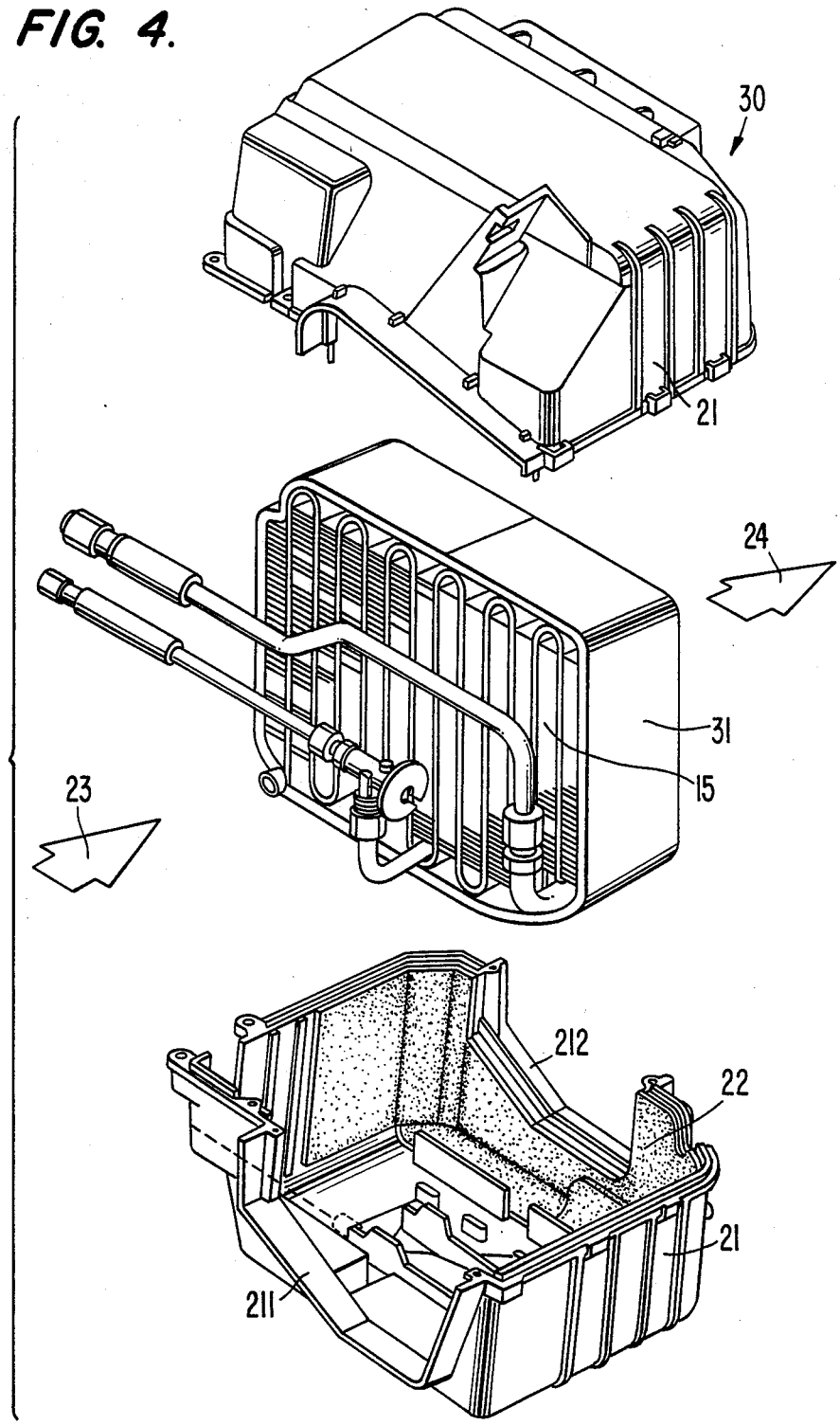
FIG. 4 is an exploded perspective view of a cooling unit in accordance with a preferred embodiment of the present invention.
Figure 5:
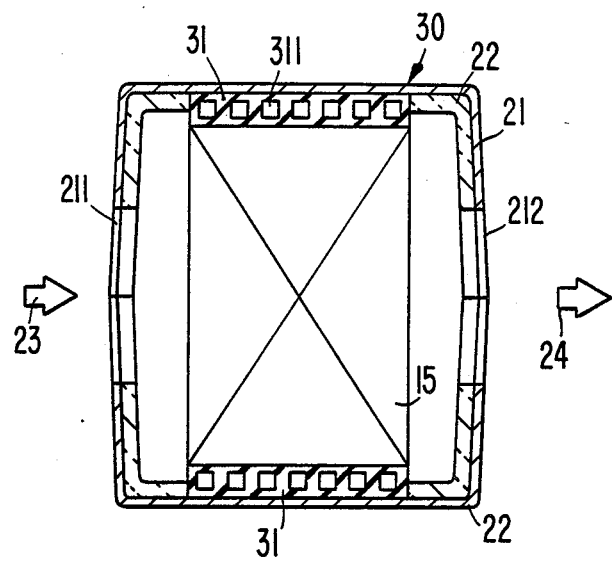
FIG. 5 is a cross-sectional side view of the cooling unit shown in FIG. 4.

Referring to the drawings in detail, wherein like numerals indicate like elements, FIGS. 4 and 5 show a cooling unit in accordance with a preferred embodiment of the present invention. Cooling unit 30 includes evaporator 15 housed in casing 21 having air inlet and air outlet openings 211, 212. As can be seen while viewing FIGS. 4 and 5, elastic member 31 surrounds a peripheral surface of evaporator 15. The remaining side surfaces of evaporator 15 face air inlet and air outlet openings 211, 212 respectively. Therefore, in an evaporator having a generally rectangular configuration, the four side walls which have a surface parallel to the air flow direction, may form the peripheral surface surrounded by the elastic member. Furthermore, elastic member 31 may be in the form of an endless belt which forms a continuous elastic ring around the evaporator. While member 31 preferably is made from rubber, other materials having suitable elastic and vibration absorbing characteristics may be used.

As can be seen while viewing FIG. 5, elastic member 31 comprises a plurality of longitudinal holes or passages 311 which form a plurality of vacant spaces or portions sealed within the outer walls of member 31.

Figure 6:
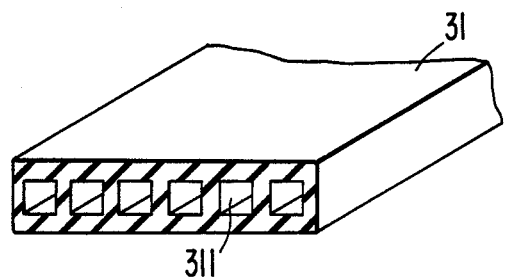
FIG. 6 is an enlarged fragmentary perspective view of the elastic member shown in FIG. 5.

The traverse sectional view of member 31 illustrates passages 311 and the sealed vacant spaces formed thereby as having a rectangular configuration (see FIG. 6). However, it should be understood that passages 311 may have other configurations without departing from the spirit and scope of the present invention.

Evaporator 15 is air-tightly disposed within casing 21 through elastic member 31. More specifically, elastic member 31 is disposed between casing 21 and evaporator 15 so that where member 31 is positioned, passages 311 essentially form the only vacant spaces between the casing and the evaporator. Accordingly, one side surface of member 31 forms an air tight seal with the casing and an opposite side surface of member 31 forms an air-tight seal with the evaporator. Therefore, elastic member 31 forms an air-tight seal between casing 21 and evaporator 15 and prevents air from passing therebetween. The remaining inner surface of casing 21, which is not in contact or lined with elastic element 31, is lined with heat insulating member 22 which may be made from foamed polystyrene or other suitable insulating material. Because elastic member 31 has heat insulating characteristics due to the material from which it is made and the insulation promoting vacant portions which may have air contained therein, the entire inner surface of casing 21 is insulated.

Figure 7:
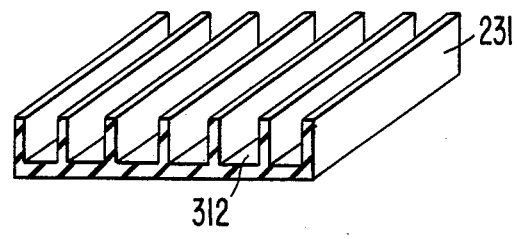
FIG. 7 is an enlarged fragmentary perspective view of the elastic member in accordance with another embodiment of the present invention.
Figure 8:
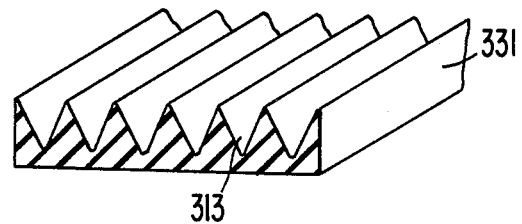
FIG. 8 is an enlarged fragmentary perspective view of the elastic member in accordance with a further embodiment of the present invention.
Figure 9:
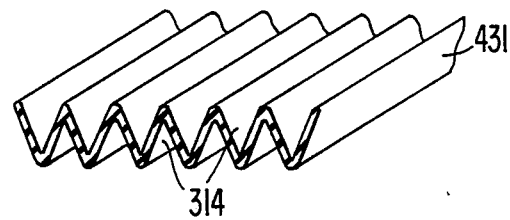
FIG. 9 is an enlarged fragmentary perspective view of the elastic member in accordance with yet a further embodiment of the present invention.

Referring to FIGS. 7-9, further embodiments of the elastic member are shown. Each elastic member 231, 331 and 431 forms an air-tight seal, as described above, between casing 21 and evaporator 15 when appropriately placed therebetween. With reference to FIG. 7, elastic member 231 includes a plurality of longitudinal rectangular grooves or passages 312 on one side thereof which form the closed or sealed vacant portions between the evaporator and the casing when member 231 is positioned therebetween. Referring to FIG. 8, elastic member 331 includes V-shaped grooves or passages 313 on one side thereof to provide closed or sealed triangular vacant portions when member 331 is positioned between the evaporator and casing. Alternatively, both sides of the elastic member which interface with the evaporator and housing, respectively, may include grooves. Such an elastic member is shown in FIG. 9 as elastic member 431. The wave-like or corrugated-like configuration of elastic member 431 forms grooves or passages 314, which may be, for example, V-shaped. Grooves 314 provide the closed or sealed vacant portions when member 431 is positioned between the evaporator and casing.

The vacant portions or spaces formed by any one of the elastic member embodiments illustrated in FIGS. 5-9 provide vibration absorption and insulating characteristics in addition to those provided by the particular material used to form the elastic member and the construction thereof.

During operation of the automotive air conditioning system, vibration from evaporator 15 due to the pulsation of refrigerant flow is effectively absorbed into elastic member 31, 231, 331 or 431. Accordingly, the transfer of vibration from evaporator 15 to casing 21 is effectively prevented, thereby reducing or eliminating noise related to evaporator vibration from reaching the automotive passenger compartment.

Having described the invention in detail, it will be recognized that the foregoing is considered as illustrative only of the principles of the invention. Since numerous modifications and charges will readily occur to those skilled in the art, it is not desired to limit the invention to the exact construction, materials, assembly and so forth shown and described. Accordingly, all suitable modifications and equivalents may be resorted to the extent they fall within the scope of the invention and claims appended hereto.

I claim:

1. A cooling unit suitable for use in an automotive air conditioning system, said cooling unit comprising a casing and an evaporator disposed within said casing, said casing including air inlet and air outlet opening to permit air flow through said evaporator, the improvement comprising:
    vibration absorbing means for absorbing vibration produced by said evaporator, said vibration absorbing means comprising an elastic member surrounding a peripheral surface of said evaporator.

2. The cooling unit of claim 1 wherein said vibration absorbing means forms an air-tight seal between the evaporator and the casing for preventing air passage therebetween.

3. The cooling unit of claim 1 wherein said vibration absorbing means is in the formm of an endless belt which forms a continuous elastic ring around the evaporator.

4. The cooling unit of claim 1 wherein the inner surface of the casing which is free from contact with said vibration absorbing means is lined with insulation.

5. The cooling unit of claim 1 wherein said evaporator includes side surfaces facing said casing air inlet and outlet openings.

6. The cooling unit of claim 1 wherein said vibration absorbing means forms vacant portions between the evaporator and the casing.

7. The cooling unit of claim 6 wherein said vacant portions are sealed from said air flow.

8. The cooling unit of claim 6 wherein said vibration absorbing means comprises a plurality of longitudinal passages which form said vacant portions.

9. The cooling unit of claim 8 wherein said vacant portions are sealed within the outer walls of the vibration absorbing means.

10. The cooling unit of claim 9 wherein said vacant portions have a rectangular transversé dimension.

11. The cooling unit of claim 8 wherein said passages are formed by grooves formed in one side of said vibration absorbing means.

12. The cooling unit of claim 11 wherein said grooves have a rectangular transverse configuration.

13. The cooling unit of claim 11 wherein said grooves have a V-shaped transverse configuration.

14. The cooling unit of claim 8 wherein said passages are formed by grooves on opposite sides of said vibration absorbing means.

15. The cooling unit of claim 14 wherein said vibration absorbing means has a corrugated configuration.

16. The cooling unit according to any one of claims 11, 12, 13, 14 or 15 wherein said vacant portions are sealed from said air flow.

17. The cooling unit according to claim 1 wherein said vibration absorbing means comprises rubber.

18. A cooling unit for an automotive air conditioning system, said cooling unit comprising a casing and an evaporator disposed within said casing, said casing including air inlet and air outlet openings to permit air flow through said evaporator, the improvement comprising:
    vibration absorbing means for absorbing vibration produced by said evaporator, said vibration absorbing means being in the form of an endless belt surrounding a peripheral surface of said evaporator, and said vibration absorbing means forming a plurality of vacant portions sealed from said air flow.

19. The cooling unit of claim 18 wherein said vibration absorbing means forms an air-tight seal between the evaporator and the casing.

20. The cooling unit of claim 19 wherein said elastic member is rubber.

* * * * *